United States Patent
Perveiler et al.

(10) Patent No.: US 12,037,962 B1
(45) Date of Patent: Jul. 16, 2024

(54) AIRBREATHING PROPULSION ENGINES INCLUDING ROTATING DETONATION AND BLUFF BODY SYSTEMS

(71) Applicant: General Electric Company, Schenectady, NY (US)

(72) Inventors: David Perveiler, West Chester, OH (US); Craig D. Young, Blanchester, OH (US); Dean P. Modroukas, Scarsdale, NY (US); Daniel Depperschmidt, Saratoga Springs, NY (US); Anthony Hazlett, West Chester, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/118,606

(22) Filed: Mar. 7, 2023

(51) Int. Cl.
| | | |
|---|---|---|
| *F02K 7/10* | (2006.01) | |
| *F02K 3/02* | (2006.01) | |
| *F02K 7/14* | (2006.01) | |
| *F23R 7/00* | (2006.01) | |

(52) U.S. Cl.
CPC .............. *F02K 7/10* (2013.01); *F02K 3/02* (2013.01); *F02K 7/14* (2013.01); *F23R 7/00* (2013.01); *F05D 2220/10* (2013.01); *F05D 2240/35* (2013.01); *F05D 2300/6033* (2013.01)

(58) Field of Classification Search
CPC ..... F02K 7/10; F02K 7/14; F02K 3/02; F23R 7/00
See application file for complete search history.

(56) References Cited

U.S. PATENT DOCUMENTS

| | | | | |
|---|---|---|---|---|
| 2,862,359 | A * | 12/1958 | Spears, Jr. ................ | F23R 3/20 60/749 |
| 3,085,401 | A * | 4/1963 | Lefebvre ................... | F23R 3/20 60/765 |
| 3,270,506 | A * | 9/1966 | Bahr ......................... | F23R 3/20 60/749 |
| 5,085,048 | A | 2/1992 | Kutschenreuter, Jr. et al. | |
| 6,347,509 | B1 | 2/2002 | Kaemming et al. | |
| 6,540,162 | B1 * | 4/2003 | Johnson .................... | F23R 3/16 239/548 |
| 6,868,665 | B2 | 3/2005 | Koshoffer et al. | |
| 7,950,219 | B2 | 5/2011 | Tangirala et al. | |
| 9,027,324 | B2 | 5/2015 | Snyder | |
| 10,151,271 | B2 | 12/2018 | Hill et al. | |
| 10,161,626 | B2 | 12/2018 | Mueller | |
| 11,473,780 | B2 * | 10/2022 | Pal ............................ | F02K 7/10 |

(Continued)

FOREIGN PATENT DOCUMENTS

CN 113551264 A 10/2021

OTHER PUBLICATIONS

Wikipedia, Scramjet, Feb. 13, 2020, Wikipedia (Year: 2020).*

*Primary Examiner* — Kyle Robert Thomas
(74) *Attorney, Agent, or Firm* — Carter, DeLuca & Farrell LLP; George Likourezos; Jason B. Scher

(57) ABSTRACT

A high-speed, air-breathing propulsion engine includes an inlet configured to compress incoming air, a fuel injector configured to supply a fuel for mixing with the compressed incoming air to form a fuel-air mixture, and a combustor configured to burn the fuel-air mixture. The combustor includes a rotation detonation combustor system and a bluff body system that cooperate to generate thrust.

20 Claims, 7 Drawing Sheets

(56) References Cited

U.S. PATENT DOCUMENTS

| | | | |
|---|---|---|---|
| 2008/0128547 A1* | 6/2008 | Pederson | F02K 7/18 |
| | | | 60/761 |
| 2017/0146244 A1 | 5/2017 | Kurosaka et al. | |
| 2019/0264920 A1* | 8/2019 | Pal | F02K 7/08 |
| 2021/0140641 A1* | 5/2021 | Singh | F02C 5/02 |

* cited by examiner

AIRBREATHING PROPULSION ENGINES INCLUDING ROTATING DETONATION AND BLUFF BODY SYSTEMS

TECHNICAL FIELD

This disclosure relates to aerial vehicles, and more particularly, to air-breathing propulsion systems that power aerial vehicles such as ramjets and scramjets.

BACKGROUND

A ramjet is a type of air-breathing jet engine that operates on the principle of ram air combustion. Unlike traditional jet engines, which compress air using a compressor, a ramjet relies on the forward motion of the engine itself to compress incoming air. As the air enters the ramjet's inlet, it is compressed by the engine's forward motion and slowed down to subsonic speeds. Fuel is then injected into the compressed air, causing it to ignite and create a high-temperature exhaust that propels the engine forward. Ramjets are capable of achieving very high speeds, typically in excess of Mach 3, but they require a significant amount of initial speed in order to operate effectively.

A scramjet or supersonic flying ramjet (SFRJ) is a ramjet engine in which the airflow through the engine remains supersonic, or greater than the speed of sound. In particular, a scramjet is a type of propulsion system used in supersonic flight that operates by compressing incoming air using a series of shock waves before mixing the compressed air with fuel and igniting the mixture in a combustion chamber. Unlike traditional jet engines, SFRJs do not rely on compressors to compress the air, but instead use the shock waves generated by the supersonic flight to create the necessary compression.

A dual-mode scramjet is a type of scramjet engine that can operate in two different modes, namely the subsonic and supersonic combustion modes. Dual-mode scramjets switch between these two modes as the speed of the vehicle changes, allowing for efficient and reliable propulsion across a wide range of speeds.

Rotating detonation engines (RDEs) take advantage of the inherent energy and thermodynamic properties and efficiency of a shock wave. RDEs include an annular detonation chamber closed at one end and open at the opposite end. A liquid fuel and an oxidizer are injected axially into the annular detonation chamber and ignited to begin a spinning detonation wave. The temperature and pressure increase across the spinning wave is generated by detonation and is intended to sustain and drive the spinning detonation wave circumferentially at supersonic speed. The reacted gas is then discharged continuously out of the open end of the detonation chamber through the nozzle, thereby generating thrust.

Bluff body flameholder systems are devices used in combustion systems to stabilize flames and promote efficient combustion. These systems include a bluff body, which is a solid object that is placed in the path of a fuel and air mixture, and which creates a recirculation zone that enhances mixing and reduces the flame's propensity to blow out. The bluff body can take various shapes, including cylinders, cones, and rings, which are placed in a duct or combustor chamber of a gas turbine engine to maintain stable and efficient combustion at high altitudes and under varying operating conditions.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying drawings of which.

Figure 1A:
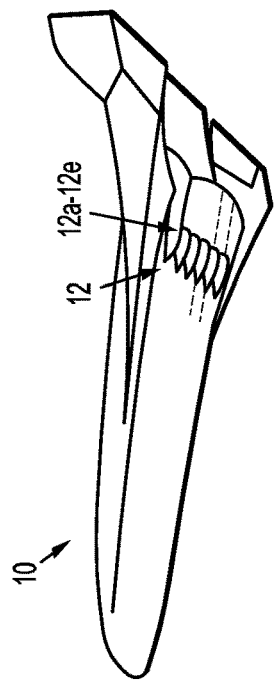
FIG. 1A a perspective view of a hypersonic vehicle in accordance with the principles of this disclosure.

Further exemplary aspects of the disclosure are described in more detail below with reference to the appended figures. Aspects of this disclosure may be combined without departing from the scope of the disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As may be used herein, the terms "first" and "second,", etc. can be used interchangeably to distinguish one component from another. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Although this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the drawings, and specific language will be used to describe the same. It will nevertheless be understood that no limitation of the scope of this disclosure is thereby intended. Any alterations and further modifications of the inventive features illustrated herein, and any additional applications of the principles of this disclosure, as illustrated herein, which would occur to one skilled in the relevant art and having possession of this disclosure, are to be considered within the scope of this disclosure.

Illustrated in FIG. 1A is a perspective view of a hypersonic aircraft 10 including a high speed, air-breathing propulsion engine 12, also referred to herein as a propulsion engine or an engine, which may include a plurality of separate and distinct engines (e.g., five separate ramjet or scramjet engines 12a to 12e). The number of engines is determined for particular applications of the aircraft 10 and may include less than or more than five engines 12 configured for high-speed operation.

For a more detailed description of similar hypersonic aircraft, one or more components of which may be included or modified for use with the disclosed aircraft 10, reference can be made to U.S. Pat. No. 5,085,048, the entire contents of which are incorporated by reference herein.

Figure 1B:
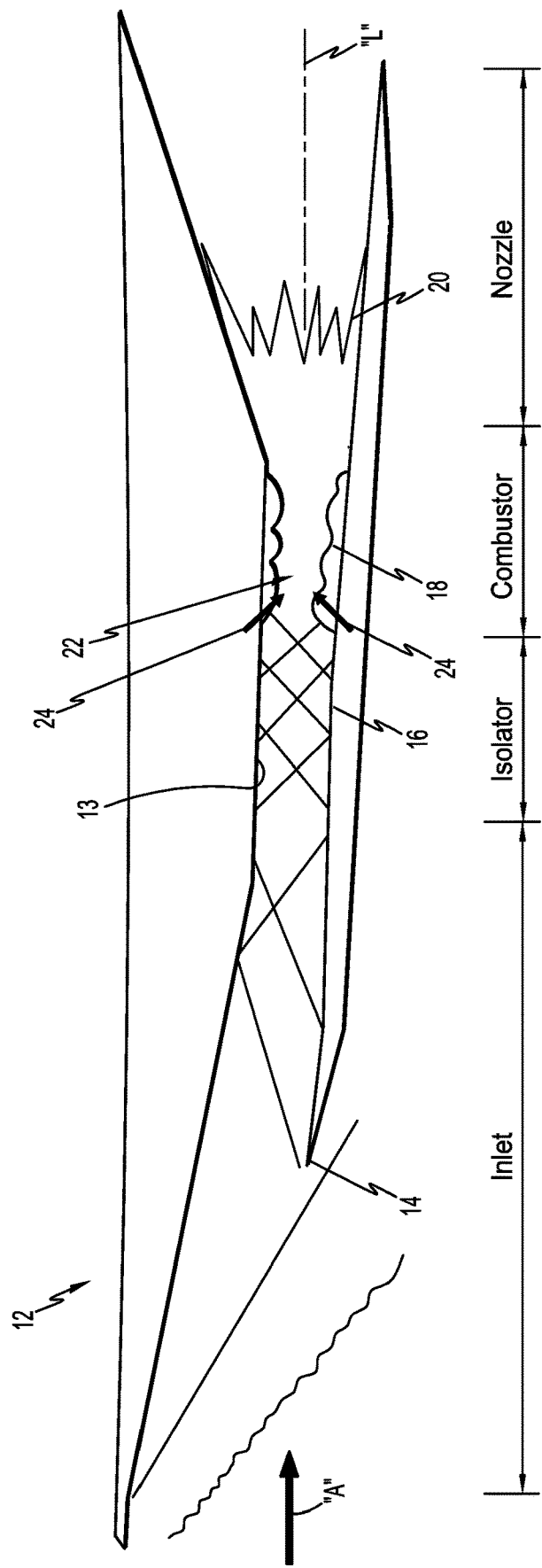
FIG. 1B is a schematic diagram of a propulsion engine of the hypersonic vehicle of FIG. 1A.

With reference to FIG. 1B, which is a schematic diagram of the high speed, air-breathing propulsion engine 12 of the hypersonic aircraft 10 of FIG. 1A, engine 12 generally includes an inlet 14, an isolator 16, a combustor 18, and a nozzle 20. Inlet 14, isolator 16, combustor 18, and nozzle 20 define a duct 22 that extends longitudinally along engine 12 for receiving and compressing air "A". Duct 22 defines a central longitudinal axis "L." Engine 12 further includes fuel injectors 24 (e.g., spray bars or the like) to supply a fuel "F" (see FIG. 3).

More specifically, inlet 14 is configured to compress, for instance via supersonic compression, the incoming air "A" (e.g., atmospheric oxygen) before combustion. Isolator 16 is disposed between inlet 14 and combustor 18. Isolator 16 is configured to contain pre-combustion flow disturbances formed by a pressure difference between inlet 14 and combustor 18, improve the homogeneity of the flow in combustor 18, and to extend the operating range of engine 12. Combustor 18 is configured to burn fuel (e.g., gaseous and/or liquid) with atmospheric oxygen to produce heat. Injectors 24 are located between combustor 18 and nozzle 20. Injectors 24 are configured to supply fuel for combustion in combustor 18. Nozzle 20 is configured to accelerate heated air to produce thrust.

Figure 2:
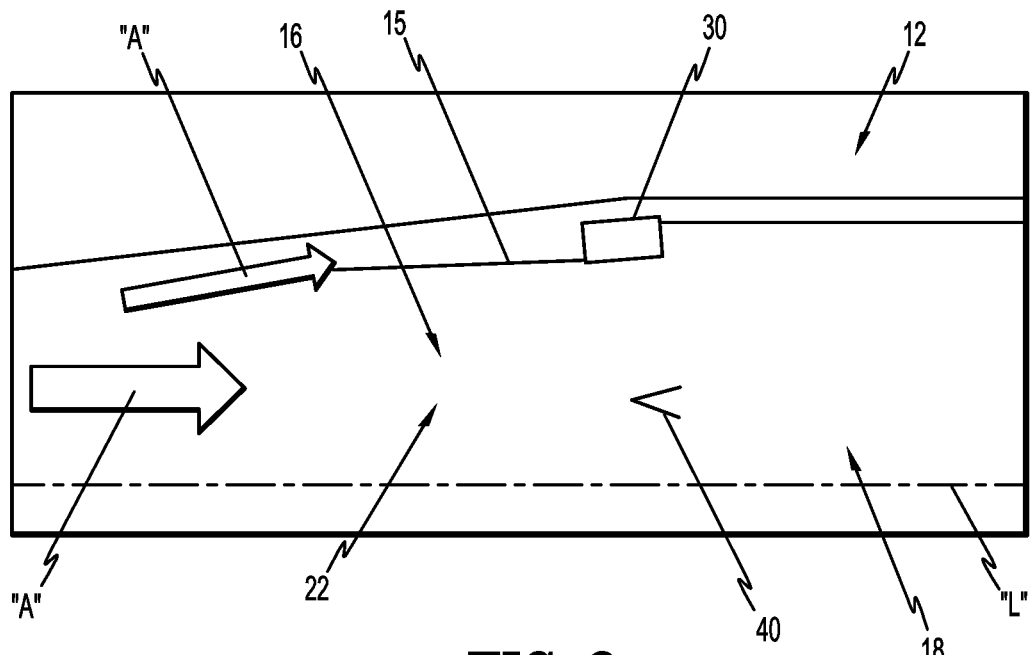
FIG. 2 is an enlarged side view of a portion of the propulsion engine of FIG. 1B and illustrates a combustor of the propulsion engine, the combustor including a rotation detonation combustor and a bluff body system.
Figure 4:
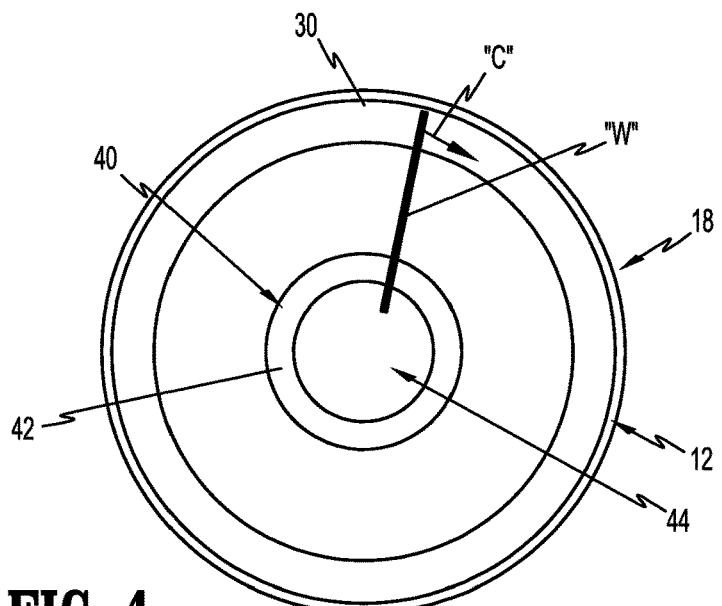
FIG. 4 is a cross-sectional view of the propulsion engine of FIG. 3 from an aft position looking forward.
Figure 5:
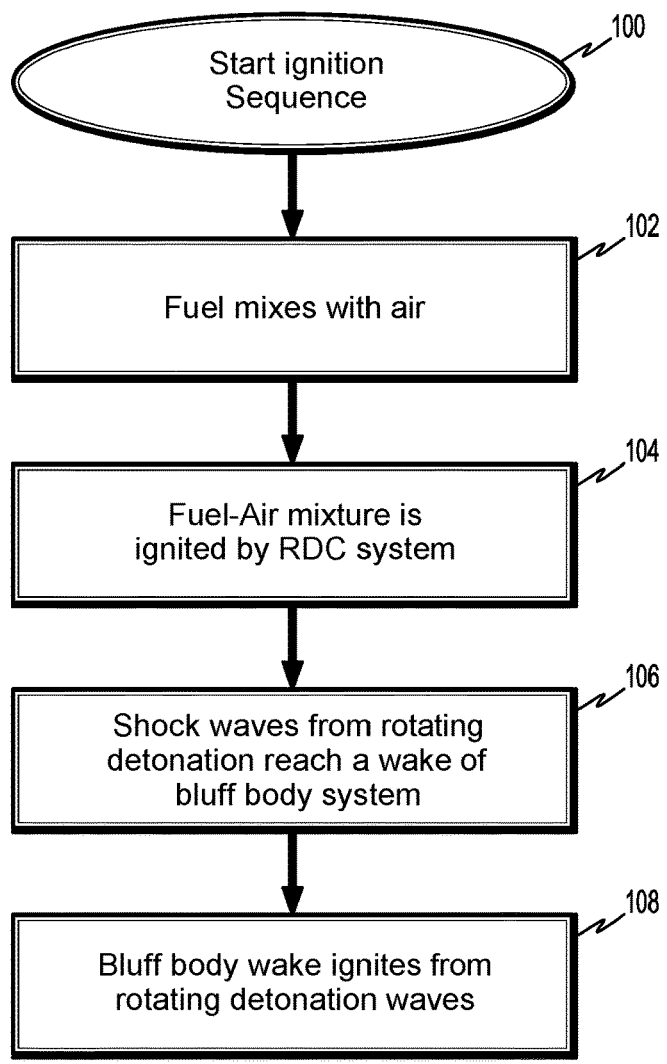
FIG. 5 is a flow chart illustrating a first ignition sequence of the hypersonic vehicle of FIG. 1A.

As seen in FIG. 2, combustor 18 of engine 12 includes a rotation detonation combustor (RDC) system 30 and a bluff body flameholder system such as a bluff body (BB) system 40, which is separate and distinct from RDC system 30. Engine 12 further includes a splitter liner 15 that pulls air off the main flow "A" for diffusing the flow in order to supply air to the RDC system 30. RDC system 30 and bluff body system 40 cooperate to generate thrust by leveraging bluff body operability benefits to improve rotation detonation combustion, and vice versa. More specifically, RDC system 30 lights off bluff body system 40 via detonation wave interaction, as illustrated in FIGS. 4 and 5, and without direct flameholder connectivity to rotation detonation combustor system 30 (no cross-fire gutters are required) for improving scalability and operability of engine 12 while shortening burning length and reducing blockage (e.g., reduced pressure losses and/or reduces system diameter). Combustor 18, integrating RDC system 30 and bluff body system 40, benefits from the reduced burning length provided by RDC system 30 and the low weight radial scalability of bluff body system 40.

Figure 3:
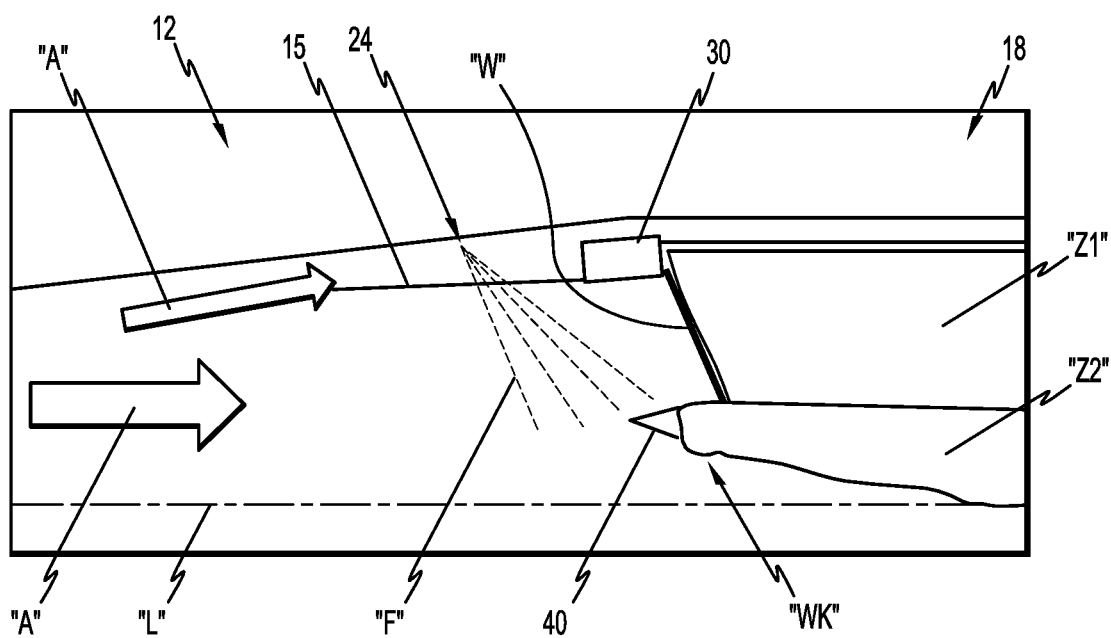
FIG. 3 is another view of FIG. 2 illustrating the rotation detonation combustor of FIG. 2 lighting off the bluff body system of FIG. 2 with a rotation detonation wave.

As seen in FIG. 3, RDC system 30 generates rotating detonation waves "W" that rotate, for example, in a clockwise direction "C" (see FIG. 4) about engine 12. In aspects, rotating detonation waves "W" extend radially inward toward a wake "WK" of bluff body system 40 to generate a first burning zone "Z1" aft of rotating detonation waves "W" and a second burning zone "Z2" aft of bluff body system 40 that provide flame stability when an upstream mixture of airflow "A" and fuel "F" is ignited (light off) by rotating detonation waves "W". FIG. 4 illustrates a bluff body 42 of bluff body system 40 having an annular configuration and defining a central bore 44; however, bluff body 42 can have any suitable configuration including any circular and/or non-circular (e.g., polygonal) configurations that develop a wake and/or a recirculation zone. In particular, bluff body system 40 can be any suitable recirculation-based flame stabilization mechanism.

With reference to FIG. 5, a first ignition sequence flowchart for the high-speed, airbreathing propulsion engine 12 of hypersonic aircraft 10 shows the ignition sequence starting at step 100. In step 102, fuel "F" mixes with air "A." Then, in step 104, a fuel-air mixture "M" is ignited by RDC system 30. Next, shock waves from the rotating detonation reach a wake "WK" of bluff body system 40 as seen in step 106. In step 108, the bluff body wake "WK" ignites from the rotating detonation waves "W".

Figure 6:
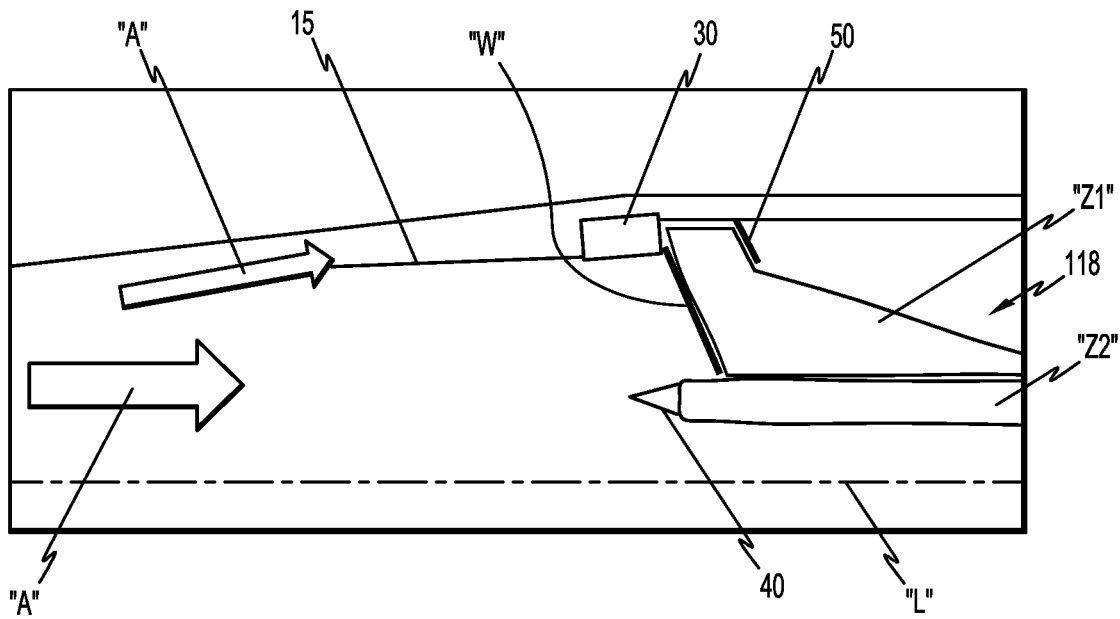
FIG. 6 is a side view of a portion of another propulsion engine of the hypersonic vehicle of FIG. 1A with a reflector.

Turning now to FIG. 6, according to one aspect, another combustor, generally referred to as a combustor 118, can further include a reflector 50 (or any number of reflectors) that extends radially inward from, for example, a body 13 (see FIG. 1B) of aircraft 10 and aft of RDC system 30 toward a longitudinal axis "L". Reflector 50 is disposed at any suitable angle (e.g., between about 0 degrees and 180 degrees) relative to longitudinal axis "L" and is positioned to extend into first burning zone "Z1" for concentrating rotating detonation waves "W" toward bluff body system 40 to provide a distant favorable ignition environment at bluff body system 40 by increasing the strength of the shock waves and improving light off capability of bluff body system 40. Reflector 50 provides greater design flexibility for placement of bluff body system 40 and can be disposed at any suitable location along engine 12. For instance, reflector 50 advantageously enables bluff body system 40 to be positioned further upstream for additional burning length than without reflector 50.

Figure 7:
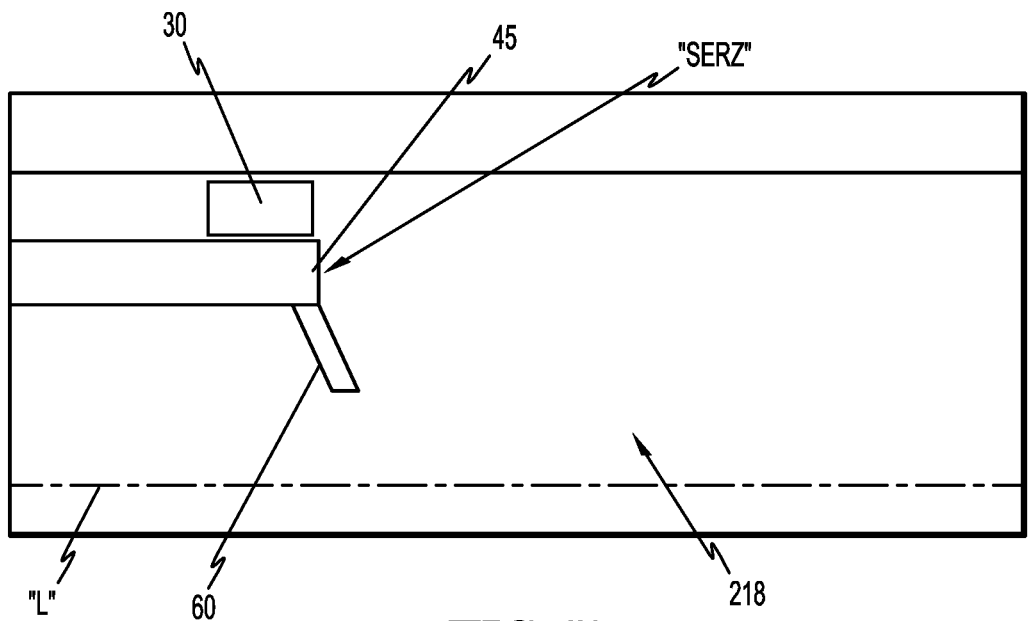
FIG. 7 is a side view of a portion of still another propulsion engine of the hypersonic vehicle of FIG. 1A.
Figure 8:
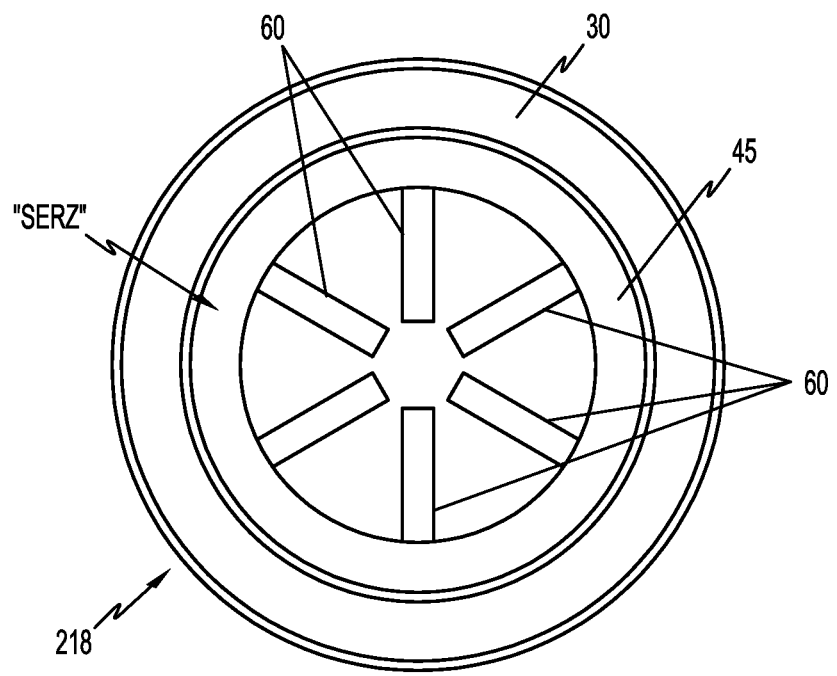
FIG. 8 is a cross-sectional view of the propulsion engine of FIG. 7 from an aft position looking forward.

Referring now to FIGS. 7 and 8, according to another aspect, one combustor, generally referred to as combustor 218, includes an RDC system 30, a sudden expansion element 45 connected to RDC system 30, and a recirculation structure 60, such as a plurality of spaced-apart radially-extending bluff bodies or cross-fire gutters such as U- or V-gutters disposed adjacent to (e.g., extending from) sudden expansion element 45. As can be appreciated, RDC system 30, sudden expansion element 45, and recirculation structure 60 are arranged to provide a physical flame path between one another and enable direct ignition of a sudden expansion recirculation zone (SERZ) from connected RDC system 30. Such structure also advantageously enables controlled ignition staging to improve operability. Moreover, sudden expansion element 45 is disposed adjacent to RDC system 30 for dividing flow between RDC system 30 and recirculation structure 60. Sudden expansion element 45 may include any suitable structure that may create a recirculation zone, such as, for example, a liner, a step(s), or combinations thereof, but may additionally and/or alternatively include, for instance, bluff bodies and/or U- or V-gutters, or combinations of any of the foregoing structures. In aspects, sudden expansion element 45 may include any suitable metallic and/or a ceramic matrix composite (CMC) material or the like.

Figure 9:
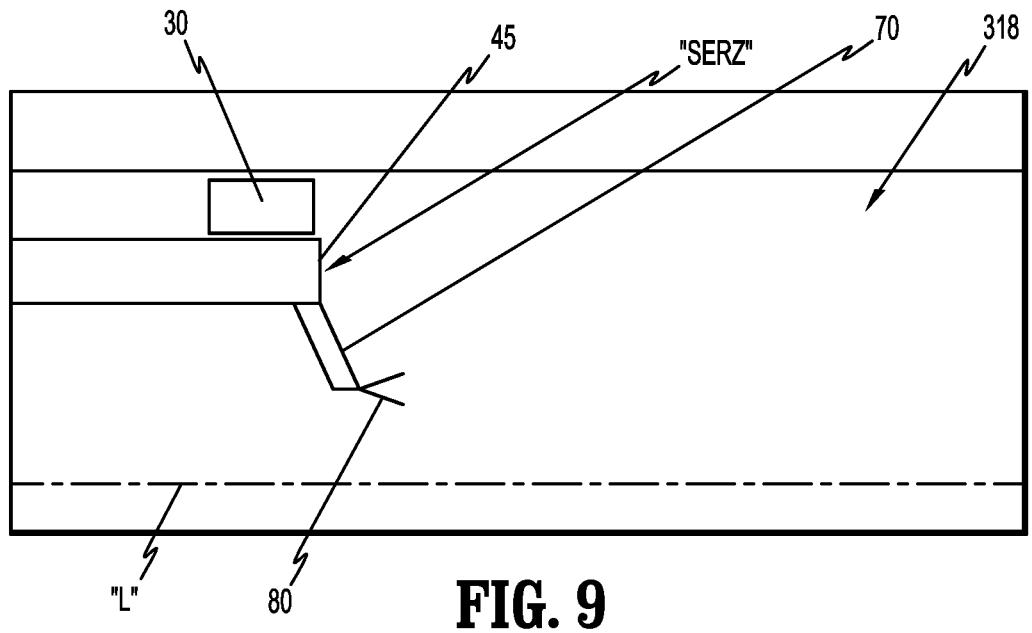
FIG. 9 is side view of a portion of yet another propulsion engine of the hypersonic vehicle of FIG. 1A.
Figure 10:
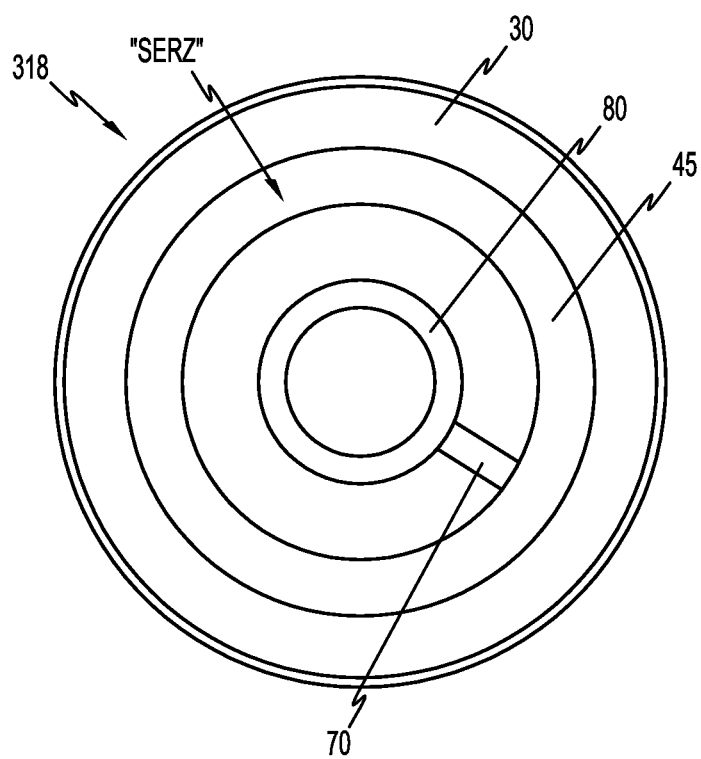
FIG. 10 is a cross-sectional view of the propulsion engine of FIG. 9 from an aft position looking forward.

As seen in FIGS. 9 and 10, in still another aspect, one combustor, generally referred to as combustor 318, includes an RDC system 30, a sudden expansion element 45 connected to RDC system 30, and a recirculation structure including one or two cross-fire gutters 70 extending from sudden expansion element 45 and a circumferential U- or V-gutter 80 coupled to cross-fire gutter(s) 70. Similar to combustor 218, combustor 318 enables direct ignition of SERZ from connected RDC system 30, and controlled ignition staging to improve operability.

Figure 11:
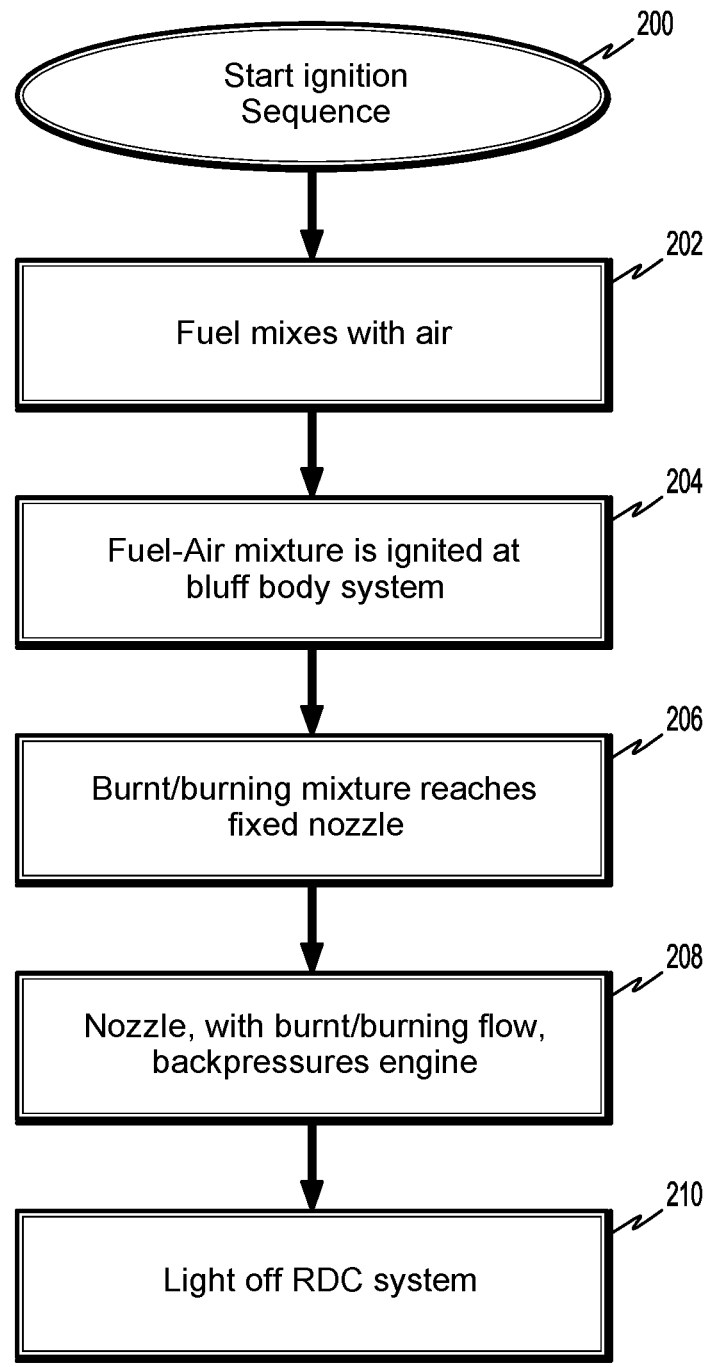
FIG. 11 is a flow chart illustrating a second ignition sequence of the hypersonic vehicle of FIG. 1A.

With reference to FIG. 11, a second ignition sequence flowchart for the high-speed, airbreathing propulsion engine 12 of aircraft 10 shows the ignition sequence starting at step 200. Then, fuel "F" mixes with air "A" as shown in step 202. Next, fuel-air mixture "M" is ignited at bluff body system 40 as illustrated in step 204. In step 206, the burnt or burning mixture "BM" reaches fixed nozzle 20. Then, in step 208, nozzle 20, with burnt or burning flow, backpressures engine 12. In step 210, with engine 12 subject to backpressure, light off of RDC system 30 is effectuated. Advantageously, such ignition sequence improves pressure and velocity at RDC system 30 to improve rotating detonation light off.

Notably, although the disclosed aspects are shown having axi-symmetric cross-sections, any of the disclosed aspects may have axi-symmetric cross-sections, non-axi symmetric cross-sections, or combinations thereof, depending upon vehicle packaging requirements. For instance, in a missile system, a cross-sectional shape for connecting the inlet to the rest of the system may be 2D, smiley-face shaped, annular, etc.

In aspects, one combustor may include multiple radially stacked RDC systems 30.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ this disclosure in virtually any appropriately detailed structure.

The phrases "in an aspect," "in aspects," "in various aspects," "in some aspects," "in other aspects," or the like, may each refer to one or more of the same or different aspects in accordance with this disclosure.

Further aspects of the present disclosure are provided by the subject matter of the following clauses.

A high-speed, air-breathing propulsion engine includes an inlet to compress incoming air, a fuel injector configured to supply fuel for mixing with the compressed incoming air to form a fuel-air mixture and a combustor configured to burn the fuel-air mixture. The combustor includes a rotation detonation combustor (RDC) system and a bluff body (BB) system that cooperate to generate thrust.

The engine according to the preceding clause, wherein the RDC system generates rotating detonation waves configured to ignite the fuel-air mixture.

The engine according to any preceding clause, wherein the RDC system creates shock waves that reach a wake of the BB system to cause the wake to ignite after the rotating detonation waves ignite the fuel-air mixture.

The engine according to any preceding clause, wherein the BB system includes a bluff body positioned to provide a recirculation zone aft of the bluff body.

The engine according to any preceding clause, wherein the combustor includes a first burning zone aft of the rotating detonation waves and a second burning zone aft of the bluff body, the first burning zone and the second burning zone being separate and distinct burning zones.

The engine according to any preceding clause, wherein the bluff body has an annular configuration.

The engine according to any preceding clause, further comprising a reflector positioned aft of the RDC system and configured to concentrate the rotating detonation waves generated by the RDC system toward the bluff body.

The engine according to any preceding clause, further comprising a nozzle disposed aft of the combustor.

The engine according to any preceding clause, further comprising an isolator disposed adjacent to the combustor.

The engine according to any preceding clause, wherein the fuel injector is a spray bar disposed upstream of the combustor.

The engine according to any preceding clause, wherein the BB system is configured to ignite the fuel-air mixture to cause the fuel-air mixture to burn, and wherein a burning mixture is configured to reach a fixed nozzle.

The engine according to any preceding clause, wherein the fixed nozzle is configured to provide backpressure to the engine to light off the RDC system.

A high-speed, air-breathing propulsion engine includes an inlet configured to compress incoming air, a fuel injector configured to supply a fuel for mixing with the compressed incoming air to form a fuel-air mixture, and a combustor configured to burn the fuel-air mixture. The combustor including a rotation detonation combustor (RDC) system, a sudden expansion element, and a recirculation structure.

The engine according to any preceding clause, wherein the recirculation structure includes a plurality of spaced-apart, radially-extending bluff bodies disposed adjacent to the sudden expansion element.

The engine according to any preceding clause, wherein the recirculation structure includes a plurality of U-shaped or V-shaped gutters disposed adjacent to the sudden expansion element.

The engine according to any preceding clause, wherein the RDC system, the sudden expansion element, and the recirculation structure are arranged to provide a physical flame path between one another and enable direct ignition of a sudden expansion recirculation zone disposed aft of the sudden expansion element.

The engine according to any preceding clause, wherein the sudden expansion element includes at least one of a liner, a step, a bluff body, or a gutter.

The engine according to any preceding clause, wherein the sudden expansion element includes at least one of a metallic or a ceramic matrix composite material.

A high-speed, air-breathing engine, the engine includes an inlet configured to compress incoming air, a fuel injector configured to supply a fuel for mixing with the compressed incoming air to form a fuel-air mixture, and a combustor configured to burn the fuel-air mixture. The combustor including a rotation detonation combustor (RDC) system, a sudden expansion element connected to the RDC system, a cross-fire gutter extending from the sudden expansion element, and a circumferential gutter coupled to the cross-fire gutter.

The engine according to any preceding clause, further comprising an isolator and a nozzle.

The engine according to any preceding clause, further comprising a splitter liner for diffusing air drawn from a main flow of air through the engine in order to supply the diffused air to the RDC system.

A hypersonic aircraft including a high-speed, air-breathing propulsion engine. The high-speed, air-breathing propulsion engine includes an inlet to compress incoming air, a fuel injector configured to supply fuel for mixing with the compressed incoming air to form a fuel-air mixture and a combustor configured to burn the fuel-air mixture. The combustor includes a rotation detonation combustor (RDC) system and a bluff body (BB) system that cooperate to generate thrust.

A hypersonic aircraft including a high-speed, air-breathing propulsion engine. The high-speed, air-breathing propulsion engine including an inlet configured to compress incoming air, a fuel injector configured to supply a fuel for mixing with the compressed incoming air to form a fuel-air mixture, and a combustor configured to burn the fuel-air mixture. The combustor including a rotation detonation combustor (RDC) system, a sudden expansion element, and a recirculation structure.

A hypersonic aircraft including a high-speed, air-breathing propulsion engine. The high-speed, air-breathing propulsion engine including an inlet configured to compress incoming air, a fuel injector configured to supply a fuel for mixing with the compressed incoming air to form a fuel-air mixture, and a combustor configured to burn the fuel-air mixture. The combustor including a rotation detonation combustor (RDC) system, a sudden expansion element connected to the RDC system, a cross-fire gutter extending from the sudden expansion element, and a circumferential gutter coupled to the cross-fire gutter.

A method for igniting a high-speed, air-breathing propulsion engine of a hypersonic aircraft includes starting an ignition sequence, mixing fuel with air, igniting a fuel-air mixture with an RDC system to cause shock waves from rotating detonation to reach a wake of a bluff body system, and igniting the wake of the bluff body system from rotation detonation waves.

A method for igniting a high-speed, air-breathing propulsion engine of a hypersonic aircraft includes starting an ignition sequence, mixing fuel with air, igniting a fuel-air mixture with a bluff body system to enable a burnt/burning mixture to reach a fixed nozzle, back pressuring the engine with burnt/burning flow from the nozzle, and lighting off an RDC system.

Persons skilled in the art will understand that the structures and methods specifically described herein and shown in the accompanying figures are non-limiting exemplary aspects, and that the description, disclosure, and figures should be construed merely as exemplary of aspects. It is to be understood, therefore, that the present disclosure is not limited to the precise aspects described, and that various other changes and modifications may be effected by one skilled in the art without departing from the scope or spirit of the disclosure. Additionally, the elements and features shown or described in connection with certain aspects may be combined with the elements and features of certain other aspects without departing from the scope of the present disclosure, and that such modifications and variations are also included within the scope of the present disclosure. Accordingly, the subject matter of the present disclosure is not limited by what has been particularly shown and described.

What is claimed is:

1. A high-speed, air-breathing propulsion engine, the engine comprising:
   an inlet configured to compress incoming air;
   a fuel injector configured to supply a fuel for mixing with the compressed incoming air to form a fuel-air mixture;
   a combustor configured to burn the fuel-air mixture, the combustor including a rotation detonation combustor (RDC) system and a bluff body (BB) system that cooperate to generate thrust; and
   a nozzle configured to provide backpressure to the engine to light off the RDC system.

2. The engine of claim 1, wherein the RDC system generates rotating detonation waves configured to ignite the fuel-air mixture.

3. The engine of claim 2, wherein the RDC system creates shock waves that reach a wake of the BB system to cause the wake to ignite after the rotating detonation waves ignite the fuel-air mixture.

4. The engine of claim 3, wherein the BB system includes a bluff body positioned to provide a recirculation zone aft of the bluff body.

5. The engine of claim 4, wherein the combustor includes a first burning zone aft of the rotating detonation waves and a second burning zone aft of the bluff body, the first burning zone and the second burning zone being separate and distinct burning zones.

6. The engine of claim 4, wherein the bluff body has an annular configuration.

7. The engine of claim 4, further comprising a reflector positioned aft of the RDC system and configured to concentrate the rotating detonation waves generated by the RDC system toward the bluff body.

8. The engine of claim 1, wherein the nozzle is disposed aft of the combustor.

9. The engine of claim 8, further comprising an isolator disposed adjacent to the combustor.

10. The engine of claim 1, wherein the fuel injector is a spray bar disposed upstream of the combustor.

11. The engine of claim 1, wherein the BB system is configured to ignite the fuel-air mixture to cause the fuel-air mixture to burn, and wherein a burning mixture is configured to reach the nozzle.

12. The engine of claim 11, wherein the nozzle is fixed relative to the combustor.

13. A high-speed, air-breathing ramjet propulsion engine, the engine comprising:
a ram inlet configured to compress incoming air;
a fuel injector configured to supply a fuel for mixing with the compressed incoming air to form a fuel-air mixture; and
a combustor configured to burn the fuel-air mixture, the combustor including a rotation detonation combustor (RDC) system, a sudden expansion element, and a recirculation structure including a gutter, wherein the RDC system is configured to create shock waves that reach a wake of the recirculation structure to cause the wake to ignite after rotating detonation waves ignite the fuel-air mixture.

14. The engine of claim 13, wherein the recirculation structure includes a plurality of spaced-apart, radially-extending gutters disposed adjacent to the sudden expansion element.

15. The engine of claim 13, wherein the recirculation structure includes a plurality of U-shaped or V-shaped gutters disposed adjacent to the sudden expansion element.

16. The engine of claim 13, wherein the RDC system, the sudden expansion element, and the recirculation structure are arranged to provide a physical flame path between one another and enable direct ignition of a sudden expansion recirculation zone aft of the sudden expansion element.

17. The engine of claim 16, wherein the sudden expansion element includes at least one of a liner, a step, a bluff body, or a gutter.

18. The engine of claim 17, wherein the sudden expansion element includes at least one of a metallic or a ceramic matrix composite material.

19. A high-speed, air-breathing engine, the engine comprising:
an inlet configured to compress incoming air;
a fuel injector configured to supply a fuel for mixing with the compressed incoming air to form a fuel-air mixture;
a combustor configured to burn the fuel-air mixture, the combustor including a rotation detonation combustor (RDC) system, a sudden expansion element connected to the RDC system, a cross-fire gutter extending from the sudden expansion element, and a circumferential gutter coupled to the cross-fire gutter; and
a nozzle configured to provide backpressure to the engine to light off the RDC system.

20. The engine of claim 19, further comprising an isolator.

* * * * *